(12) United States Patent
Pinkse et al.

(10) Patent No.: US 12,470,411 B2
(45) Date of Patent: Nov. 11, 2025

(54) TIME-DOMAIN PHYSICAL UNCLONABLE KEY (TPUK) AUTHENTICATED COMMUNICATION

(71) Applicant: UNIVERSITEIT TWENTE, NB Enschede (NL)

(72) Inventors: Pepijn Pinkse, KJ Enschede (NL); Matthijs Velsink, EA Amsterdam (NL)

(73) Assignee: UNIVERSITEIT TWENTE (UT), Enschede (NL)

( * ) Notice: Subject to any disclaimer, the term of this patent is extended or adjusted under 35 U.S.C. 154(b) by 568 days.

(21) Appl. No.: 17/793,652

(22) PCT Filed: Jan. 19, 2021

(86) PCT No.: PCT/EP2021/025020
§ 371 (c)(1),
(2) Date: Jul. 19, 2022

(87) PCT Pub. No.: WO2021/148242
PCT Pub. Date: Jul. 29, 2021

(65) Prior Publication Data
US 2023/0089344 A1    Mar. 23, 2023

Related U.S. Application Data

(60) Provisional application No. 62/963,214, filed on Jan. 20, 2020.

(51) Int. Cl.
*H04L 9/32* (2006.01)
*H04L 9/08* (2006.01)
(Continued)

(52) U.S. Cl.
CPC .......... *H04L 9/3278* (2013.01); *H04L 9/0825* (2013.01); *H04L 9/3271* (2013.01); *H04L 12/2885* (2013.01); *H04L 15/20* (2013.01)

(58) Field of Classification Search
CPC . H04L 9/3278; H04L 9/3271; H04L 12/2885; H04L 15/20
See application file for complete search history.

(56) References Cited

U.S. PATENT DOCUMENTS

| | | | |
|---|---|---|---|
| 2007/0125857 A1* | 6/2007 | Tuyls | H04L 9/3278 235/454 |
| 2013/0243187 A1* | 9/2013 | Horstmeyer | G09C 1/00 380/28 |

(Continued)

FOREIGN PATENT DOCUMENTS

| | | |
|---|---|---|
| EP | 2 693 685 B1 | 9/2017 |
| EP | 3 252 740 | 8/2018 |

(Continued)

OTHER PUBLICATIONS

S. A. Goorden et al.: „Quantum-Secure Authentication with a Classical Key, retrieved from the Internet: URL:http://arxiv.org/abs/1303.0142, pp. 1-8 (2013).

(Continued)

*Primary Examiner* — Ellen Tran
(74) *Attorney, Agent, or Firm* — Norman B. Thot

(57) ABSTRACT

A method for a PUK authenticated communication includes creating an optical challenge in a time-frequency domain, providing the optical challenge to a tPUK which includes a spatial input channel and a plurality of spatial output channels, and detecting in which of the plurality of spatial output channels a short temporally focused pulse is created. The tPUK provides a complex challenge-response behavior in the time-frequency domain. The optical challenge is created so that the tPUK creates the response having a short temporally focused pulse in only one of the plurality of spatial output channels of the tPUK.

29 Claims, 8 Drawing Sheets

(51) Int. Cl.
H04L 12/28 (2006.01)
H04L 15/20 (2006.01)

(56) References Cited

U.S. PATENT DOCUMENTS

| | | |
|---|---|---|
| 2015/0215115 A1 | 7/2015 | Pikus |
| 2015/0229482 A1 | 8/2015 | Pinkse et al. |
| 2016/0377423 A1* | 12/2016 | Eilers .................. H04L 9/00 356/601 |
| 2019/0109719 A1* | 4/2019 | Davis .................. H04L 9/0869 |
| 2019/0156066 A1 | 5/2019 | Foster et al. |

FOREIGN PATENT DOCUMENTS

| | | |
|---|---|---|
| WO | WO 2017/177105 A1 | 10/2017 |
| WO | WO 2017/207219 A1 | 12/2017 |
| WO | WO 2019/021206 A2 | 1/2019 |

OTHER PUBLICATIONS

C. Taddei et al.: „High-Selectivity On-Chip Optical Bandpass Filter With Sub-100-MHz Flat-Top and Under-2 Shape Factor, IEEE Photonics Technology Letters, vol. 31, No. 6, pp. 455-458 (2019).

A. Monmayrant et al.: "A newcomer's guide to ultrashort pulse shaping and characterization", Journal of Physics B: Atomic, Molecular and Optical Physics, vol. 43, pp. 1-34 (2010).

T. B. H. Tentrup et al.: "Large-alphabet quantum key distribution using spatially encoded light", New Jornal of Physics, vol. 21, pp. 1-7 (2019).

R. G. H. Van Uden et al.: „Ultra-high-density spatial division multiplexing with a few-mode multicore fibre, nature photonics, vol. 8, pp. 865-870 (2014).

B. T. Bosworth et al.: „High-speed ultrawideband photonically enabled compressed sensing of sparse radio frequency signals, Optics Letters, vol. 38, No. 22, pp. 4892-4895 (2013).

B. Redding et al.: "All-fiber spectrometer based on speckle pattern reconstruction", Optics Express, vol. 21, No. 5, pp. 6584-6600 (2013).

D. J. McCabe et al.: „Spatio-temporal focusing of an ultrafast pulse through a multiply scattering medium, nature Communications, vol. 2, pp. 1-5 (2011).

B. Skoric: "Quantum readout of Physical Unclonable Functions", Africacrypt, LNCS, vol. 6055, pp. 1-21 (2010).

M. Mounaix et al.: "Spatiotemporal Coherent Control of Light through a Multiple Scattering Medium with the Multispectral Transmission Matrix", Physical Review Letters, vol. 116, pp. 253901-1-253901-5 (2016).

L. De Angelis et al.: „Spatial Distribution of Phase Singularities in Optical Random Vector Waves, Physical Review Letters, vol. 117, pp. 093901-1-093901-5 (2016).

B. Skoric et al.: "Authenticated communication from quantum readout of PUFs", Quantum Inf Process, vol. 16, No. 200, pp. 1-9 (2017).

C. Taballione: "Integrated Programmable Waveguide Circuits for Classical and Quantum Photonic Processing", Dissertation University of Twente, pp. 1-138 (1988).

B. Skoric: "Security analysis of Quantum-Readout PUFs in the case of challenge-estimation attacks", Quantum Information and Computation, vol. 16, pp. 1-8 (2016).

S. A. Goorden et al.: „Quantum-secure authentication of a physical unclonable key, optica, vol. 1, No. 6, pp. 421-424 (2014).

Q. Guo et al.: "Compressive sensing based high-speed time-stretch optical microscopy for two-dimensional image acquisition", Optics Express, vol. 23, No. 23, pp. 29639-29646 (2015).

R. Uppu et al.: "Asymmetric cryptography with physical unclonable keys", Quantum Science and Technology, vol. 4, pp. 1-8 (2019).

J. Aulbacii et al.: "Control of Light Transmission through Opaque Scattering Media in Space and Time", Piiysical Review Letters, vol. 106, pp. 103901-1-103901-4 (2011).

C. Taballione et al.: "8×8 Programmable Quantum Photonic Processor based on Silicon Nitride Waveguides", Opties Express, vol. 27, pp. 1-7 (2019).

B. T. Bosworth et al.: "High-speed flow microscopy using compressed sensing with ultrafast laser pulses", Optics Express, vol. 23, No. 8, pp. 10521-10532 (2015).

T. B. H. Tentrup et al.: „Transmitting more than 10 bit with a single photon, Optics Express, vol. 25, No. 3, pp. 2826-2833 (2017).

Y. Bromberg et al.: "Remote key establishment by random mode mixing in multimode fibers and optical reciprocity", Optical Engineering, vol. 58, No. 1, pp. 016105-1-016105-10 (2019).

R. Pappu et al.: "Physical One-Way Functions", Science, vol. 297, pp. 2026-2030 (2002).

M. C. Velsink: "Time-domain wavefront shaping for secure communication", Master Thesis Applied Physics, University of Twente, pp. 1-46 (2019), unpublished before the priority date of the present invention.

M. C. Velsink et al.: "Spatiotemporal focusing through a multimode fiber via time-domain wavefront shaping", Optics Express, vol. 29, No. 1, pp. 272-290 (2020).

O. Katz et al.: "Focusing and compression of ultrashort pulses through scattering media", nature photonics, vol. 5, pp. 372-377 (2011).

B. C. Grubel et al.: „Silicon photonic physical unclonable function, Optics Express, vol. 25, No. 11, pp. 12710-12721 (2017).

D. Marpaung et al.: "Integrated microwave photonics", nature photonics, vol. 13, pp. 18-90 (2019).

B. Skoric et al.: "Security of Quantum-Readout PUFs against quadrature based challenge estimation attacks", Int. J. of Quantum Information, vol. 11, pp. 1-11 (2013).

L.V. Amitonova et al.: „Multimode-fiber-based high-dimensional quantum secure communication, IEEE Photonics Society Summer Topicals Meeting Series, pp. 1-13 (2018).

C. Mesaritakis et al.: "Physical Unclonable Function based on a Multi-Mode Optical Waveguide", Scientific Reports, vol. 8, pp. 1-12 (2018).

* cited by examiner

TIME-DOMAIN PHYSICAL UNCLONABLE KEY (TPUK) AUTHENTICATED COMMUNICATION

CROSS REFERENCE TO PRIOR APPLICATIONS

This application is a U.S. National Phase application under 35 U.S.C. § 371 of International Application No. PCT/EP2021/025020, filed on Jan. 19, 2021 and which claims benefit to U.S. Provisional Patent Application No. 62/963,214, filed on Jan. 20, 2020. The International Application was published in English on Jul. 29, 2021 as WO 2021/148242 A1 under PCT Article 21(2).

FIELD

The present invention is related to the field of Physical Unclonable Keys (PUKs), in particular to optical PUKs. The present invention is in particular related to a method for PUK authenticated communication and to a system for PUK authenticated communication.

BACKGROUND

Optical Physical Unclonable Keys (PUKs, also called PUFs in cryptography) are based on the interference pattern created when a laser beam propagates through an inhomogeneous medium that acts as a multiple-scattering material. See "Physical one-way functions", R. Pappu, B. Recht, J. Taylor, and N. Gershenfeld, Science 297, 2026 (2002). PUKs have interesting security properties that set them apart from digital keys: (i) theft of a physical object is easy to detect, whereas digital keys can be stealthily copied; and, (ii) PUKs can be authenticated without the need to store any secret information. The security of PUK authentication is based on the complexity of the physical structure, making physical cloning infeasible.

In a "hands-on" situation the verifier has direct control of the PUK; the verifier knows that he/she is performing measurements on an object of the right type, and hence unclonability alone guarantees security. The situation is completely different in a "hands-off" setting, where the PUK is remote or otherwise out of reach of the verifier. According to the standard attacker model, the full challenge-response behavior is known to attackers; hence the hands-off setting makes it possible for an attacker to emulate the behavior of the PUK without possessing the physical PUK itself, e.g., using a lookup table. This is known as digital emulation. Surprisingly, there a defense exists against digital emulation: Quantum Readout of PUKs as described in "Quantum readout of Physical Unclonable Functions", B. Skoric. Africacrypt 2010. LNCS 6055, 369-386 (2010). The PUK challenge is sent as a quantum state, which makes it impossible for the attacker to learn what the challenge is. The implementation of this concept with challenges and responses encoded in transverse optical wavefronts was described in EP 2693685 B1 and the experimental demonstration published as "Quantum-secure authentication of a physical unclonable key", S. A. Goorden, M. Horstmann, A. P. Mosk, B. Skoric, P. W. H. Pinkse, Optica 1, 421-424 (2014). QSA has been extended to authenticate data, as described in "Authenticated communication from quantum readout of PUFs", B. Skoric, P. W. H. Pinkse, A. P. Mosk, Quantum Information Processing 16, 200 (2017), and to encrypt information, as described in "Asymmetric cryptography with Physical Unclonable Keys", R. Uppu, T. A. W. Wolterink, S. A. Goorden, B. C. Chen, B. Skoric, A. P. Mosk, P. W. H. Pinkse, Quantum Sci. Technol. 4, 045011 (2019).

An extension of PUK-based authentication is to use a PUK directly in secure asymmetric communication without the need for quantum key distribution (QKD). Asymmetric communication does not require a key pair for every communication channel, as only the receiving party (Bob) requires a key. For a scattering PUK, a set of wavefronts is determined that either give a focus on position "0" or on position "1". Direct and secure binary communication in the direction of Bob (the PUK owner) is then possible, provided this set of wavefronts is publicly known. In this PUK-enabled asymmetric communication (PEAC) protocol, an eavesdropper (Eve) cannot directly determine the transmitted bit by viewing the sent wavefront, as it contains fewer photons than degrees of freedom in the wavefront.

However, all these schemes require an optical channel containing many transverse spatial modes which is technically challenging at long distances. See "Transmitting more than 10 bit with a single photon", T. B. H. Tentrup, T. Hummel, T. A. W. Wolterink, R. Uppu, A. P. Mosk, P. W. H. Pinkse, Opt. Expr. 25, 2826-2833 (2017), and "Large-alphabet quantum key distribution using spatially encoded light", T. B. H. Tentrup, W. M. Luiten, R. van der Meer, P. Hooijschuur, and P. W. H. Pinkse, New J. Phys. 21, 123044 (2019). Multimode fibers provide a solution only at intermediate distances, and that only at the cost of much added complexity. See "Multimode-fiber-based high-dimensional quantum secure communication", L. V. Amitonova, T. B. H. Tentrup, I. M. Vellekoop, and P. W. H. Pinkse, which was accepted for publication in Opt. Expr. ArXiv 1801.07180, and "Remote key establishment by random mode mixing in multimode fibers and optical reciprocity", Y. Bromberg, B. Redding, S. M. Popoff, N. Zhao, G. Li, and H. Cao, Opt. Engineer. 58, 016105 (2019). At long (km) distances, these fibers' temporal variability and loss reduce performance. Multicore fibers do not provide a solution either since the phase stability between the cores is not given. See "Ultra-high-density spatial division multiplexing with a few-mode multicore fibre", R. van Uden, R. Amezcua Correa, E. Antonio Lopez, F. M. Huijskens, C. Xia, G. Li, A. Schülzgen, H. de Waardt, A. Koonen, and C. M. Okonkwo, Nat. Photon. 8 (11), 865-870 (2014).

SUMMARY

An aspect of the present invention is to provide an improved method and system for PUK authenticated communication, in particular to allow for PUK authenticated communication via long distances.

In an embodiment, the present invention provides a method for a PUK authenticated communication which includes creating an optical challenge in a time-frequency domain, providing the optical challenge to a tPUK which comprises a spatial input channel and a plurality of spatial output channels, and detecting in which of the plurality of spatial output channels a short temporally focused pulse is created. The tPUK is configured to provide a complex challenge-response behavior in the time-frequency domain. The optical challenge is created so that the tPUK creates the response having a short temporally focused pulse in only one of the plurality of spatial output channels of the tPUK.

BRIEF DESCRIPTION OF THE DRAWINGS

The present invention is described in greater detail below on the basis of embodiments and of the drawings in which.

DETAILED DESCRIPTION

Figure 1:
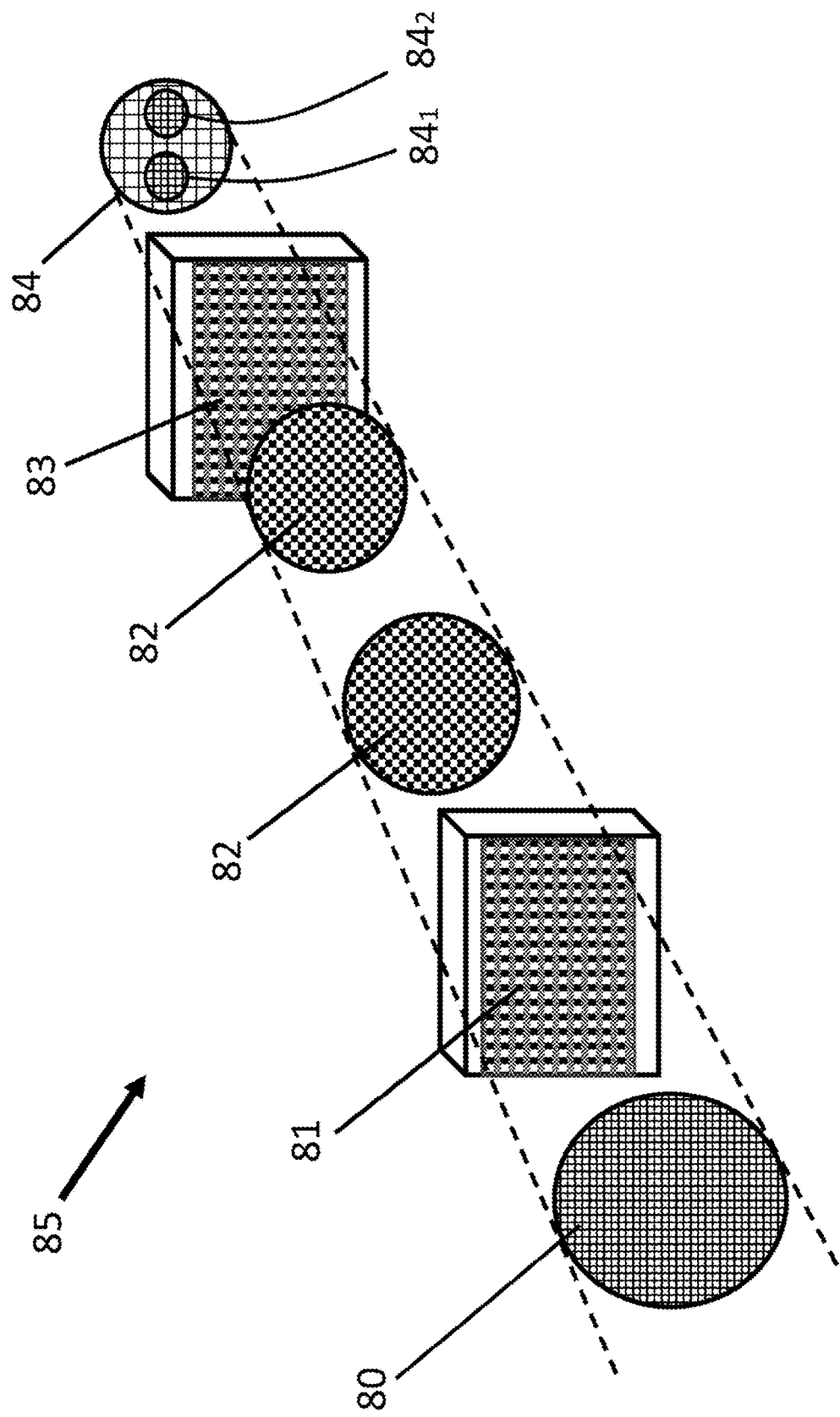
FIG. 1 schematically illustrates a setup of Physical-key Enhanced Asymmetric Communication (PEAK) according to the state of the art.

One basic idea on which the present invention is based is to replace spatial domain encoding of challenges by a time-frequency domain encoding of challenges. Since light modulated only in the time-frequency domain can propagate through a single spatial channel, this approach is completely compatible with long-distance communication, for example, through single-mode fibers or free-space links.

This new approach also requires a new type of PUK that comprises a complex challenge-response behavior in the time-frequency domain. The present invention provides several physical examples that fulfill this requirement and allow for a successful realization. The new aspect here is the encoding in time. These new PUKs are therefore termed temporal-domain PUKs or time-frequency PUKs or in short tPUKs.

The method and system according to the present invention also can be realized in a way that is quantum secure which makes it impossible for an attacker to fully analyze/copy the challenge and/or to fully analyze the response in order to guess the challenge.

More specifically, the present invention exploits results on spatial-temporal wavefront shaping, where it was shown that by wavefront shaping the incoming light on a scattering medium, the output light can be focused in space and time simultaneously. See "Control of light transmission through opaque scattering media in space and time", J. Aulbach, B. Gjonaj, P. M. Johnson, A. P. Mosk, and A. Lagendijk, Phys. Rev. Lett. 106, 103901: 1-4 (2011). McCabe et al. went one step further and showed that this wavefront shaping can also be performed in the spectral-temporal domain by shaping the ultrashort light pulse that illuminates the scattering medium via a single spatial mode. See "Spatio-temporal focusing of an ultrafast pulse through a multiply scattering medium", McCabe, Tajalli, Austin, Bondareff, Walmsley, Gigan & Chatel, Nat. Comm. 2, 447 (2011). By combining these ideas with those in PEAC ("Asymmetric cryptography with Physical Unclonable Keys", R. Uppu, T. A. W. Wolterink, S. A. Goorden, B. C. Chen, B. Skoric, A. P. Mosk, P. W. H. Pinkse, Quantum Sci. Technol. 4, 045011 (2019)), the present invention provides a method that wavefront shapes, for example, a few-photon weak light pulse with a pulse shaper so that in one out of a few outputs of the tPUK a focus can be discriminated. In the method, the sender (Alice) can use the public knowledge of Bob's tPUK to send weak pulses of light that are shaped so that they will lead to a short temporal focus in one of the several output channels of Bob's tPUK. The ultrashort pulses in the output are too short for any electronic device to be discriminated and will be detected by a nonlinear technique such as that described in "Spatio-temporal focusing of an ultrafast pulse through a multiply scattering medium", McCabe, Tajalli, Austin, Bondareff, Walmsley, Gigan & Chatel, Nat. Comm. 2, 447 (2011) or by using HOM-type quantum interference at Bob's side. Since the weak pulses sent by Alice contain only few or even a single photon, they are extremely hard to characterize by an adversary who does not possess Bob's PUK. For optimal operation of the method, the transmission of the tPUK, and the efficiency of the ultrashort pulse detection in Bob's output channels should be optimized to a point where the quantum character of the light (in other words, the quantum noise) prevents an adversary from emulating the tPUK with a set of pulse shapers.

The present invention proposes a radically new approach that has not previously been described. It will add a completely new security primitive that can authenticate a party who is on the other side of, for example, the single-mode fiber by physical means. It is noted that Alice can authenticate herself to Bob in the same way with a tPUK of her own. Next, this bare authentication can be turned into authentication of data by using an output channel index as key material for a message authentication code. Then, Alice and Bob can turn their authenticated communication channel into a confidential authenticated channel using Quantum Key Distribution over the single-mode fiber. Quantum authentication of time-frequency PUKs is thus a basic primitive from which a fully-fledged secure channel can be bootstrapped.

The readout of time-frequency PUKs assumes the availability of suitable time-frequency PUKs. These tPUKs must have a complex challenge-response behavior in the time-frequency domain and low losses. Various aspects determine the usability of PUKs: manufacturing and characterization ease, optical losses, the complexity, collision distance, and the stability with external factors such as temperature, humidity and durability/wear. Several examples satisfying the above requirements will be given below.

The present invention will now be more fully described.

According to a first aspect of the present invention, the present invention is directed to a method for PUK authenticated communication, comprising the following steps:

Creating an optical challenge in a time-frequency domain;

Providing the optical challenge to a tPUK for creating a response, the tPUK comprising a spatial input channel and a plurality of spatial output channels, and the tPUK comprising a complex challenge-response behavior in the time-frequency domain, wherein the challenge is created so that in the response, a short temporally focused pulse is created in only one of the spatial output channels of the tPUK; and Detecting in which output channel the short temporally focused pulse is created.

The method according to the present invention is suited for PUK authenticated communication. This covers a method that can be used only for authentication purposes. However, it also covers a method that can be used for a subsequent secure communication after an authentication was successful.

The optical challenge is created in the time-frequency domain. The optical challenge is not limited to a specific frequency range. The applied frequencies can, for example, be in the visible-infrared part of the spectrum. Contrary to previously-described solutions, the optical challenge is not encoded spatially. This is an advantage when transmitting the optical challenge to the PUK. It is, however, possible to encode the optical challenge additionally in a spatial domain leading to an optical challenge in a time-frequency-spatial domain. In an embodiment of the present invention, the optical challenge can, for example, be transmitted to the spatial input channel of the tPUK through a single spatial channel. This is possible without a problem only for challenges encoded in the time-frequency domain. For optical challenges additionally also encoded in the spatial domain, however, this would require additional phase stabilization of the different spatial channels.

The tPUK comprises a spatial input channel and a plurality of spatial output channels and the tPUK furthermore comprises a complex challenge-response behavior in the time-frequency domain. The tPUK can be realized in different ways and specific embodiments will be further explained below. In general, however, the tPUK comprises a spatial input channel. This can, for example, be exactly one spatial input channel which is the simplest and most elegant embodiment of the present invention. It is also possible that the tPUK comprises another spatial input channel, for example, two, three, four or more spatial input channels. According to the first aspect of the present invention, the tPUK comprises a plurality of spatial output channels. These spatial output channels can, for example, be technically identical and of the same nature. The number of the spatial output channels is at minimum two spatial output channels. However, it can also be three, four, five, six, ten or even more spatial output channels. The more spatial output channels are applied, the more secure the method for PUK authenticated communication becomes. More details about security aspects of the present invention will be further described below. According to the present invention, the tPUK comprises a complex challenge-response behavior in the time-frequency domain. As usual when talking about secure communication applications, the term complex indicates that it is extremely hard or even impossible to precisely calculate the response behavior of the tPUK in advance given an intercepted challenge. The response created by passing the tPUK is also encoded in the time-frequency domain. In other words, the tPUK acts on the challenge in a manner that depends on time and frequency of the presented challenge.

According to the present invention, the challenge is created so that in the response, a short temporally focused pulse is created in only one of the spatial output channels of the tPUK. A respective challenge-response pair for a specific tPUK can initially be created using feedback-control algorithms in pulse shaping techniques.

A short temporally focused pulse typically has a length in the femtosecond domain. If the short temporally focused pulse is depicted in an intensity time diagram, a proper peak is depicted which can be clearly distinguished from a timewise arbitrarily shaped pulse without a focus, but basically showing a noise profile.

According to the present invention, it is furthermore detected in which output channel the short temporally focused pulse is created. There exist several possibilities for a respective detection which will be described subsequently. By detecting and reporting back to the sender (Alice) in which output channel the short temporally focused pulse is created, a receiver of a challenge (Bob) sent by the sender can authenticate himself/herself to the sender. This bare authentication can furthermore be turned into authentication of data by using an output channel index as key material for a message authentication code.

In an embodiment of the present invention, the optical challenge can, for example, be transmitted to the spatial input channel of the tPUK through a single spatial channel. This allows for a long-distance communication, for example, about hundreds or thousands of kilometers. Such a long-distance communication was not possible with previously-described solutions. In an embodiment, the single spatial channel can, for example, comprise a single-mode fiber. In an embodiment, the single spatial channel can, for example, comprise a free-space link.

In an embodiment of the present invention, the method can, for example, further comprise the following steps:
Emitting an ultrashort laser pulse; and
Creating the optical challenge in the time-frequency domain by pulse shaping of the ultrashort laser pulse.

The emitted ultrashort laser pulse can, for example, have a length in the femtosecond domain. Its length is, for example, about 100 femtoseconds, but it can also be longer or shorter. The optical challenge that is created by pulse shaping of the ultrashort laser pulse is typically longer than the ultrashort laser pulse; the optical challenge can, for example, be in the picosecond domain, for example, 100 picoseconds. The optical challenge is in any case significantly longer than the ultrashort laser pulse, typically by about a factor of 500, 1000 or 2000.

There exist several different pulse shaping techniques that can be applied. A standard solution is the use of a pulse shaper based on the Fourier transform, relating the temporal description of an optical field to its spectral description. Exploiting this equivalence, and given that no electronic circuit is fast enough to electro-optically modulate an optical pulse on the sub 10 picosecond time scale, pulse shapers are based on a dispersive element to spatially spread out an ultrashort pulse in its spectral components (typically by an optical grating), a modulator that changes phase or amplitude of the various spectral components, and another dispersive element to recombine the spectral components to form the shaped pulse.

In an embodiment of the present invention, pulse shaping can, for example, be realized by using a dispersion compensating fiber (DCF) with a negative group velocity dispersion to spread the ultrashort pulse to 10 nanoseconds. This is long enough to allow a fast modulator to modify up to approximately 200 individual time windows within the chirped pulse. The stretched pulse is subsequently compressed again to an ultrashort pulse by a normal dispersion fiber that is matched to the DCF. The advantage of this method is its robustness. A disadvantage is that it requires some kilometers of a fiber, a very fast modulator, and very fast electronics. It can, however, be completely integrated and fiber based and it can be boxed in a rack mount without needing regular alignment.

In an embodiment of the present invention, detecting in which output channel the short temporally focused pulse is created can, for example, comprise discriminating a short pulse in the one output channel from longer pulses in the other output channels.

Similar to the situation at challenge creation, the short temporally focused pulse in the one output channel can be in the fs domain and the longer pulses can be in the picosecond domain. In general, the long unfocused pulses can, for example, be longer than the short temporally focused pulse by a factor of 500, 1000 or 2000.

In an embodiment of the present invention, detecting in which output channel the short temporally focused pulse is created can, for example, comprise using a non-linear detection technique. A non-linear detection technique is, for example, based on two-photon absorption followed by fluorescence in an organic dye, for example, a rhodamine 6G sample as described in "Focusing and compression of ultra-short pulses through scattering media", O. Katz, E. Small, Y. Bromberg, and Y. Silberberg, Nat. Photonics 5, 372 (2011), and in "Spatiotemporal Coherent Control of Light through a Multiple Scattering Medium with the Multispectral Transmission Matrix", M. Mounaix et al., Phys. Rev. Lett. 116, 253901 (2016). Alternatively, non-linear mixing with a stronger reference pulse, for example, in a non-linear waveguide, can be applied, or the use of ultrafast number-resolving superconducting detectors. Streak cameras can alternatively be applied.

In an embodiment of the present invention, detecting in which output channel the short temporally focused pulse is created can, for example, comprise a gating technique. A gating technique applied within the present invention must be ultrafast. A reference optical pulse can open or close an optical gate on an ultrashort time scale using ultrafast optical techniques, such as the optical Kerr effect, free-carrier density modulation, optical (population) pumping, or by three-wave or four-wave mixing.

In an embodiment of the present invention, the number n of photons in the challenge can, for example, be less than the number N of spectral components in the challenge. The number N of spectral components can be individually manipulated by pulse shaping. This feature leads to quantum security; if the number n of photons in the challenge is less than the number N of spectral components in the challenge, it is physically impossible to completely read out the spectral characteristics of the challenge. The scheme is secure against spectrometer attacks.

In an embodiment of the present invention, the number P of separate spectral response elements in the tPUK can, for example, be greater than the number N of spectral components in the challenge. This has the advantage of creating a much larger challenge space; there can exist many shaped pulses that lead to the same peak in the same output, making it harder for an eavesdropper to guess what pulse was sent.

In an embodiment of the present invention, the tPUK can, for example, comprise a multi-mode fiber. A multi-mode optical fiber is a type of optical fiber mostly used for a communication over short distances, such as within a building or on a campus. Multi-mode fibers have a large core diameter that enables multiple light modes to be propagated, but the maximum length of a transmission link is limited because of modal dispersion. Additionally, chromatic dispersion is another limit to the useful length for multi-mode fiber optic cable. Exactly these disadvantages are of use when applying a multi-mode fiber as a tPUK.

In an embodiment of the present invention, the multi-mode fiber can, for example, be at least partly coiled up or at least partly bent and substantially immobilized. Coiling up or bending large-core fibers increase the effect that the multi-mode fiber has a very complex input-output behavior as a tPUK. The spectrum memory effect moreover quickly becomes more narrowband with length, as described in "All-fiber spectrometer based on speckle pattern reconstruction", B. Redding, S. M. Popoff, and H. Cao, Opt. Expr. 21, 6584 (2013), meaning that for long fibers, a slightly different wavelength already leads to another output pattern. This is exactly what is needed for tPUK applications. The potential of multi-mode fibers as PUKs was recently realized. See "Physical Unclonable Function based on a Multi-mode Optical Waveguide", C. Mesaritakis, M. Akriotou, A. Kapsalis, E. Grivas, C. Chaintoutis, T. Nikas, and D. Syvridis, Sci. Rep. 8, 9653 (2018). These have not, however, been used as tPUKs. Substantially immobilizing the multi-mode fiber provides reproducibility and the creation of specific challenge-response pairs. Immobilizing basically means fixing, for example, by casting a multi-mode fiber in a solid host.

In an embodiment of the present invention, the multimode fiber can, for example, end in a so-called photonic lantern in which the large core of the multimode fiber gradually changes over in several separate output waveguides. This simplifies the analysis of the output since one does not need to mount and align an output objective, but can work with one or more single-mode output fibers. Photonic lanterns are normally made by adiabatically merging several single-mode cores into one multimode core. They provide low-loss interfaces between single-mode and multimode systems where the precise optical mapping between cores and individual modes is unimportant.

In an embodiment of the present invention, the tPUK can, for example, comprise an integrated photonic structure. Integrated photonic structures or photonic integrated circuits (PIC) are devices that integrate multiple (at least two) photonic functions. The photonic integrated circuit provides function for information signals imposed on optical wavelength typically in the visible spectrum or near infrared.

Integrated photonic structures have not yet been considered as candidates for PUKs or tPUKs. The closest devices concerning functionality are linear chaotic resonators, as described in "Spatial Distribution of Phase Singularities in Optical Random Vector Waves", L. De Angelis, F. Alpeggiani, A. Di Falco, and L. Kuipers, Phys. Rev. Lett. 117, 093901 (2016), and silicon non-linear resonators, as described in "Silicon photonic physical unclonable function", B. C. Grubel, B. T. Bosworth, M. R. Kossey, Hongcheng Sun, A. B. Cooper, M. A. Foster, and A. C. Foster, Opt. Express 25, 12710 (2017) and WO 2017/177105 A1. Integrated photonics is a relatively mature technology. In an embodiment, the integrated photonic structure can, for example, comprise $Si_3N_4$. Additionally or alternatively, the integrated photonic structure comprises a silicon-on-insulator (SOI) or other optical transparent materials such as AlO or III-IV materials such as AlGaAs.

In an embodiment of the present invention, the integrated photonic structure can, for example, comprise a network of ring resonators. On-chip optical ring resonators (also called micro-ring resonators, MRRs) are routinely built for filter applications. Experience is that the exact optical length of a typical ring resonator cannot be controlled to be better than about 0.1%. This variation is caused by uncontrollable variations in the exact width of the waveguides and intrinsic variations in the index of refraction of the material base used (for example, $Si_3N_4$ or SOI). As a consequence, although the free-spectral range of a ring resonator can be designed to about 0.1%, the exact position of the resonances in the optical spectral domain is effectively random, but fixed after manufacturing. A tPUK comprising an integrated photonic structure can therefore be designed that has a single input, several outputs, low losses, and a very complex challenge-response behavior in the time-frequency domain that cannot easily be reproduced.

The network of ring resonators can comprise single, double, triple or even more resonators manipulating one spectral component. However, the integrated photonic structure can, for example, comprise a network of double ring resonators. This is due to the fact that light should be completely transmitted through the tPUK from the input side to the output side and should not be reflected back to the input side. This is even more important due to the quantum security aspect that only a few photons are applied as a challenge.

In an embodiment of the present invention, the network can, for example, comprise one input waveguide and a plurality of output waveguides, wherein the challenge is distributed from the input waveguide to the plurality of output waveguides by a plurality of M sequentially arranged double ring resonators, the M double ring resonators having different resonance frequencies. The network can, for example, comprise exactly one input waveguide, but a plurality of output waveguides, for example, two, three, four, five, ten or even more output waveguides. The input waveguide can, for example, be arranged centrally and the output waveguides can, for example, be arranged symmetrically above and below the central input waveguide. A thus symmetric arrangement allows for a good distribution of the photons through the network, thus enabling that a designed short temporally focused pulse within one of the output channels can have significant intensity/a significantly high number of photons (which is still low).

In an embodiment of the present invention, the network can, for example, be substantially built up of unit cells, the unit cells comprising racetrack-shaped ring resonators forming a double ring resonator and couplers for coupling a ring resonator to its upper or lower neighbor or to an input or output waveguide (which is the input channel or one of the plurality of output channels). This design is advantageous because it is more economic space wise; it is possible to use a smaller chip surface area for the same micro-ring resonator compared to a situation in which a circular micro-ring resonator is applied. Couples are placed in the straight section of the multi-ring resonator, coupling the ring-resonator to its upper or lower neighbor or input/output waveguide.

In an embodiment of the present invention, the unit cells can, for example, comprise a designed randomly-chosen length variation. This allows for enhancing the complexity of a challenge-response behavior. The randomly-chosen variation in length can, for example, be realized within a straight section of the MRR. On top of this there are fabrication-induced random length variations (typically about 0.1%) which cannot be controlled and which therefore hinder a precise copying of the unit cell.

A second aspect of the present invention is directed to a method for a PUK authenticated communication, comprising the following steps:
Creating an optical challenge in a time-frequency domain;
Providing the optical challenge to a tPUK for creating a response, the tPUK comprising a spatial input channel and a spatial output channel and the tPUK comprising a complex challenge-response behavior in the time-frequency domain, wherein the challenge can be created so that in the response, a short temporally focused pulse is created in the spatial output channel of the tPUK; and
Detecting if the short temporally focused pulse is created in the spatial output channel.

The terminology applied within the description of the second aspect of the present invention is the same as already described and defined with respect to the first aspect of the present invention. The following will therefore only focus on decisive differences between the second aspect of the present invention and the first aspect of the present invention.

According to the second aspect of the present invention, the number of output channels is different; only one spatial output channel is here needed. Exactly one spatial input channel and exactly one spatial output channel can, for example, be used. This configuration is in principle sufficient for PUK authenticated communication. The method allows for distinguishing a test pulse (decoy) from a correct challenge that is created so that as a response, a short temporally focused pulse is created. This distinction also allows for an authentication of the receiving party to the sender.

In an embodiment of the present invention, if the short temporally focused pulse is, for example, created in the spatial output channel, it is, for example, detected when the temporally short pulse occurs. Even if exactly one spatial output channel is applied, it is therefore still possible to encode more than one bit of information within this output channel. As an example, the entire pulse duration of the measured pulse within the output channel can be divided into different intervals and it can be decided in which time interval the short temporally focused pulse occurs/has its peak.

The method according to the second aspect of the present invention can be combined with the method according to the first aspect of the present invention fully or partly, as long as no technical contradictions occur. The same challenge creating methods and detection methods can in particular be applied, as can the different kinds of tPUKs.

A third aspect of the present invention is directed to a system for PUK authenticated communication comprising:
A challenge creating means adapted for creating an optical challenge in a time-frequency domain;
A tPUK comprising a spatial input channel, a plurality of spatial output channels, and a complex challenge-response behavior in the time-frequency domain, wherein the challenge creating means is adapted to create the optical challenge so that in the response, a short temporally focused pulse is created in only one of the spatial output channels; and
A detection device adapted for detecting in which output channel the short temporally focused pulse is created.

All features mentioned with respect to the third aspect of the present invention are identically or at least analogously defined as in the description of the first aspect of the present invention. Complete repetitions of definitions are therefore omitted, however, explicit reference is made to the passages with respect to the first aspect of the present invention.

In an embodiment of the present invention, a single spatial channel can, for example, be adapted for transmitting the optical challenge to the spatial input channel of the tPUK.

In an embodiment of the present invention, the single spatial channel can, for example, comprise a single-mode fiber or consists of a single-mode fiber.

In an embodiment of the present invention, the single spatial channel can, for example, comprise a free-space link or consist of a free-space link.

In an embodiment of the present invention, the tPUK can, for example, comprise a multi-mode fiber.

In an embodiment of the present invention, the device can, for example, comprise a coherent light source, in particular an ultrashort laser, and a challenge creating means which can be embodied as described with respect to the first aspect of the present invention.

In an embodiment of the present invention, the detection device can, for example, be adapted for carrying out a non-linear detection technique. According to an alternative or additional embodiment, the detection device can, for example, be adapted for carrying out a gating technique.

In an embodiment of the present invention, the number n of photons in the challenge can, for example, be less than the number N of spectral components in the challenge. This provides quantum security.

In an embodiment of the present invention, the number P of separate spectral response elements in the tPUK can, for example, be greater than the number N of spectral components in the challenge. This enlarges the challenge space and enhances security.

In an embodiment of the present invention, the tPUK can, for example, comprise a multi-mode fiber. The multi-mode fiber can, for example, be at least partly coiled up or at least partly bent and substantially immobilized.

In an embodiment of the present invention, the tPUK can, for example, comprise an integrated photonic structure. The tPUK can, for example, comprise a network of ring resonators.

In an embodiment of the present invention, the integrated photonic structure can, for example, comprise a network of double ring resonators.

In an embodiment of the present invention, the network can, for example, comprise one input waveguide and a plurality of output waveguides, wherein the challenge is distributed from the input waveguide to the plurality of output waveguides by a plurality of M sequentially arranged double ring resonators, the M double ring resonators having different resonance frequencies.

In an embodiment of the present invention, the network can, for example, be substantially built up of unit cells, the unit cells comprising racetrack-shaped ring resonators forming the double ring resonators and couplers for coupling a ring resonator to its upper or lower neighbor or to an input or output waveguide.

In an embodiment of the present invention, the unit cells can, for example, comprise a designed randomly-chosen length variation.

In an embodiment of the present invention, the integrated photonic structure can, for example, comprise $Si_3N_4$ and/or a silicon-on-insulator (SOI).

A fourth aspect of the present invention is directed to the system for PUK authenticated communication comprising:
  A challenge creating means adapted for creating an optical challenge in a time-frequency domain;
  A tPUK comprising a spatial input channel, a spatial output channel, and a complex challenge-response behavior in the time-frequency domain, wherein the challenge creating means is adapted to create the optical challenge so that in the response, a short temporally focused pulse can be created in the spatial output channel; and
  A detection device adapted for detecting if the short temporally focused pulse is created in the output channel.

The system according to the fourth aspect of the present invention therefore fits to the method according to the second aspect of the present invention. The basic difference between the fourth aspect of the present invention and the third aspect of the present invention is the number of output channels. The tPUK here comprises exactly one spatial input channel and exactly one spatial output channel. This is still sufficient, however, for secure authentication, as explained in more detail with respect to the second aspect of the present invention.

All definitions and further explanations with respect to technical terms in the fourth aspect of the present invention fit exactly to the explanation and definitions provided with respect to the first aspect of the present invention.

In an embodiment of the present invention, the detection device can, for example, be adapted to identify when the short temporally focused pulse occurs in the output channel. As already explained above with respect to the second aspect of the present invention, a single output channel of the tPUK is also sufficient for encoding more than one bit.

A fifth aspect of the present invention is directed to the use of an integrated photonic structure as a tPUK for authentication and/or encryption purposes.

The present invention will be explained below under reference to the drawings.

FIG. 1 schematically illustrates a setup of Physical-key Enhanced Asymmetric Communication (PEAK) 85 according to the state of the art. A coherent light source, for example, a laser (not shown), is adapted to emit a light pulse 80, for example, with only a low number of photons for quantum security reasons. The light pulse 80 is directed to a challenge creating means 81 which is adapted to create a challenge 82 in the spatial-frequency domain. The challenge creating means can be realized by a spatial light modulator (SLM) for manipulating the phase and/or amplitude of light. As long as the number of photons in the challenge is smaller than the number of independently controlled parameters/channels in the challenge creating means 81, it is impossible for an eavesdropper to fully read out the challenge because of the laws of quantum mechanics.

The challenge 82 created by Alice is then sent to Bob for authentication purposes. Bob owns a PUK 83 which acts on the basis of light scattering and has a complex challenge-response behavior in the spatial-frequency domain. Depending on which challenge was sent by Alice, a spatial detection device detects a spatially focused pulse in either detection area $84_1$ or in detection area $84_2$. Detection area $84_1$ can, for example, encode a "0" in binary code and detection area $84_2$ can, for example, encode a "1" in binary code. Bob can then communicate his detection result to Alice for authenticating himself. Since the challenge is encoded in the spatial-frequency domain, it is required that the transmission of the challenge to the PUK takes place via an optical channel containing many transverse spatial modes. This becomes technically challenging or even impossible at long distances. The present invention offers a solution for quantum secure authenticated communication over long distances.

Figure 2:
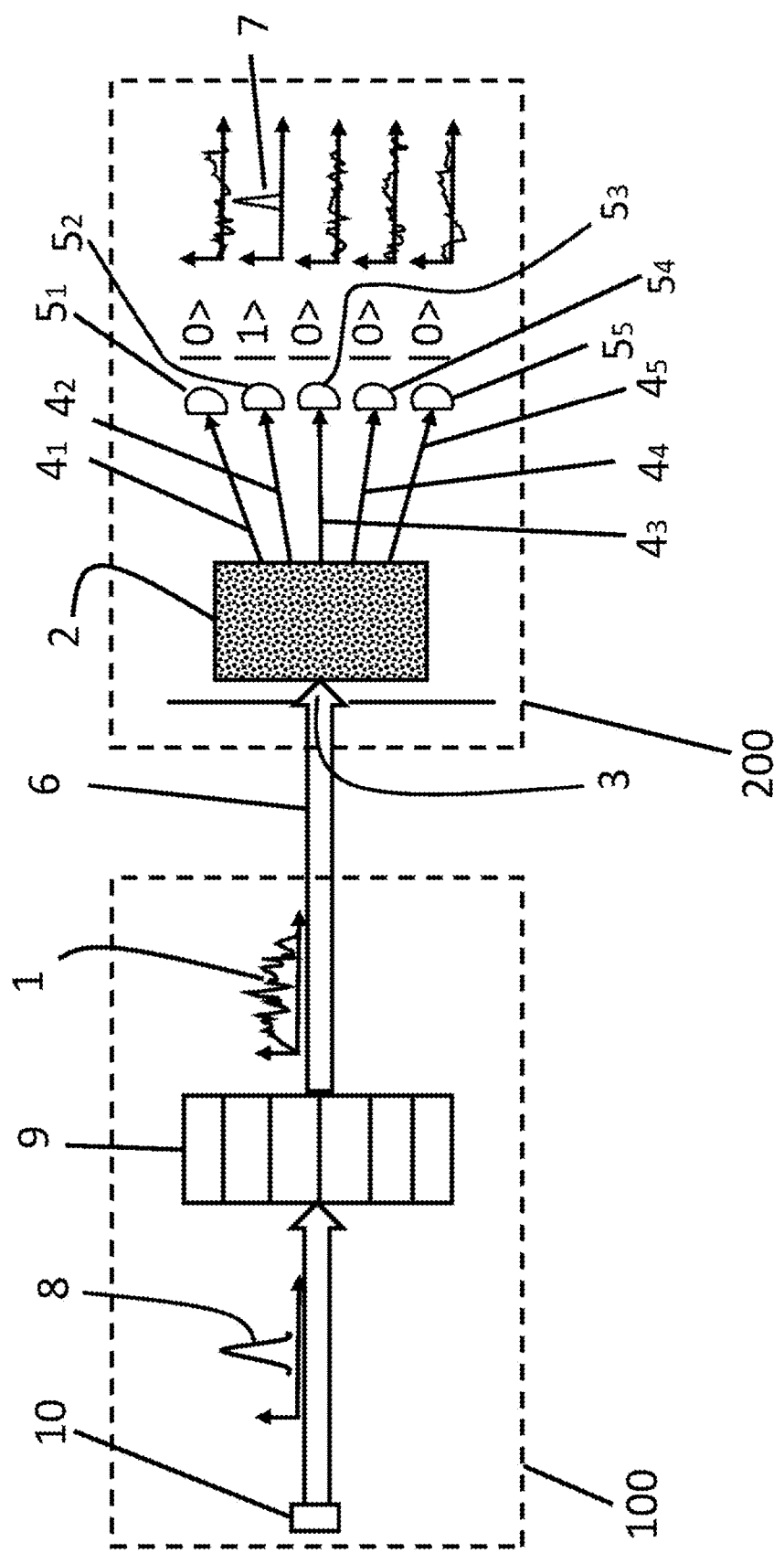
FIG. 2 schematically illustrates tPUK authenticated communication according to the present invention.

FIG. 2 schematically illustrates principles of tPUK authenticated communication according to the present invention. A basic principle of tPUK authenticated communication is to encode challenge-response pairs in the time-frequency domain instead of in the spatial-frequency domain. This change of concept of course also requires the availability or development of new PUKs comprising a complex challenge-response behavior in the time-frequency domain. A coherent light source, for example, a laser 10 operating in the visible-infrared regime, emits an ultrashort light pulse 8. The profile of the ultrashort light pulse 8 is depicted in FIG. 2 in the inset diagram, showing the intensity of the pulse versus time. The pulse duration in the presented example is about 100 fs. Other pulse lengths are, however, also possible, for example, 50 fs, 200 fs or 500 fs. The emitted ultrashort light pulse 8 is presented to the challenge creating means 9 which is adapted to create an optical challenge 1 in the time-frequency domain. In FIG. 2, the optical challenge 1 is depicted in another inset diagram, showing the intensity of the pulse versus time. Compared to the initial ultrashort light pulse 8, the pulse of the optical challenge 1 is longer, for example, about a factor of 100, for example, about 10 ps in the presented example. The complex challenge-response behavior of the challenge creating means 9 results in a complex pulse profile of the optical challenge 1 with temporally varying intensities and different frequency parts. After challenge creation at Alice's side (indicated by the box 100), the optical challenge 1 is sent to Bob's side (indicated by the box 200) through a single spatial mode which is a single mode fiber 6 in the depicted embodiment. The use of a single spatial mode for transmission allows the PUK authenticated communication scheme to also be realized for long distances.

Bob possesses a tPUK 2 with a complex challenge-response behavior in the time-frequency domain (concrete realizations of the tPUK will be described below). Furthermore, the tPUK 2 comprises exactly one spatial input channel 3 and a plurality of spatial output channels 4. In the present embodiment, five different spatial output channels $4_1 \ldots 4_5$ are formed. It is, however, also possible that the tPUK 2 comprises exactly two, three, four, six or 10 or even more spatial output channels 4. The optical challenge 1 is created by Alice so that in the response, a short temporally focused pulse is created in only one of the spatial output channels $4_1 \ldots 4_5$ of the tPUK 2. The output pulses in each spatial output channel $4_1 \ldots 4_5$ are depicted as small inset diagrams next to a respective detector $5_1 \ldots 5_5$ assigned to each spatial output channel $4_1 \ldots 4_5$. In the depicted example, a short temporally focused pulse 7 is created in the second spatial output channel 42 which is detected with the detector 5 or detection region $5_2$. The short temporally focused pulse 7 has a length similar to the ultrashort light pulse 8 and is about 100 fs in the depicted example. In the other spatial output channels $4_1, 4_3, 4_4$ and $4_5$, the detectors $5_1, 5_3, 5_4, 5_5$ detect longer pulses without a clear or sharp focus. In the exemplary embodiment, their pulse duration is about 10 ps which is in a similar range as the length of the optical challenge 1. For tPUK authenticated communication, it is then detected in which of the spatial output channels $4_1 \ldots 4_5$ the short temporally focused pulse 7 is created. The result can then be communicated to Alice for authentication of Bob. Note that Alice can authenticate herself to Bob in the same way with a tPUK 2 of her own. This bare authentication can then be turned into authentication of data by using the output channel index. Alice and Bob can then turn their authenticated communication channel into a confidential authenticated channel using quantum key distribution over the single-mode fiber 6. Quantum authentication of tPUKs 2 is thus a basic primitive from which a fully-fledged secure channel can be bootstrapped.

In the depicted embodiment, the number n of photons in the optical challenge 1 is less than the number N of spectral components in the optical challenge 1. This provides quantum security. In the described embodiment, the number P of separate spectral response elements in the tPUK is furthermore greater than the number N of spectral components in the challenge. This enlarges the challenge space and contributes to security as well.

According to an alternative embodiment, the tPUK 2 comprises exactly one spatial input channel 3 and exactly one spatial output channel 4. It can then be discriminated by Bob if a short temporally focused pulse 7 is created in the single spatial output channel 4 or not. This distinction can be used for encoding bits as well. For example, if a short temporally focused pulse 7 is detected, this encodes a "0", if no short temporally focused pulse 7 is detected, this encodes a "1" or vice versa. In an embodiment, it is not only the presence of a short temporally focused pulse that is detected, but it is also detected when the short temporally focused pulse occurs. It is, for example, possible to divide the whole response pulse into several time intervals and to determine in which of the intervals the short temporally focused pulse 7 occurs (for example, to detect in which interval the peak maximum occurs). This also allows for encoding of more than one bit.

Figure 3:
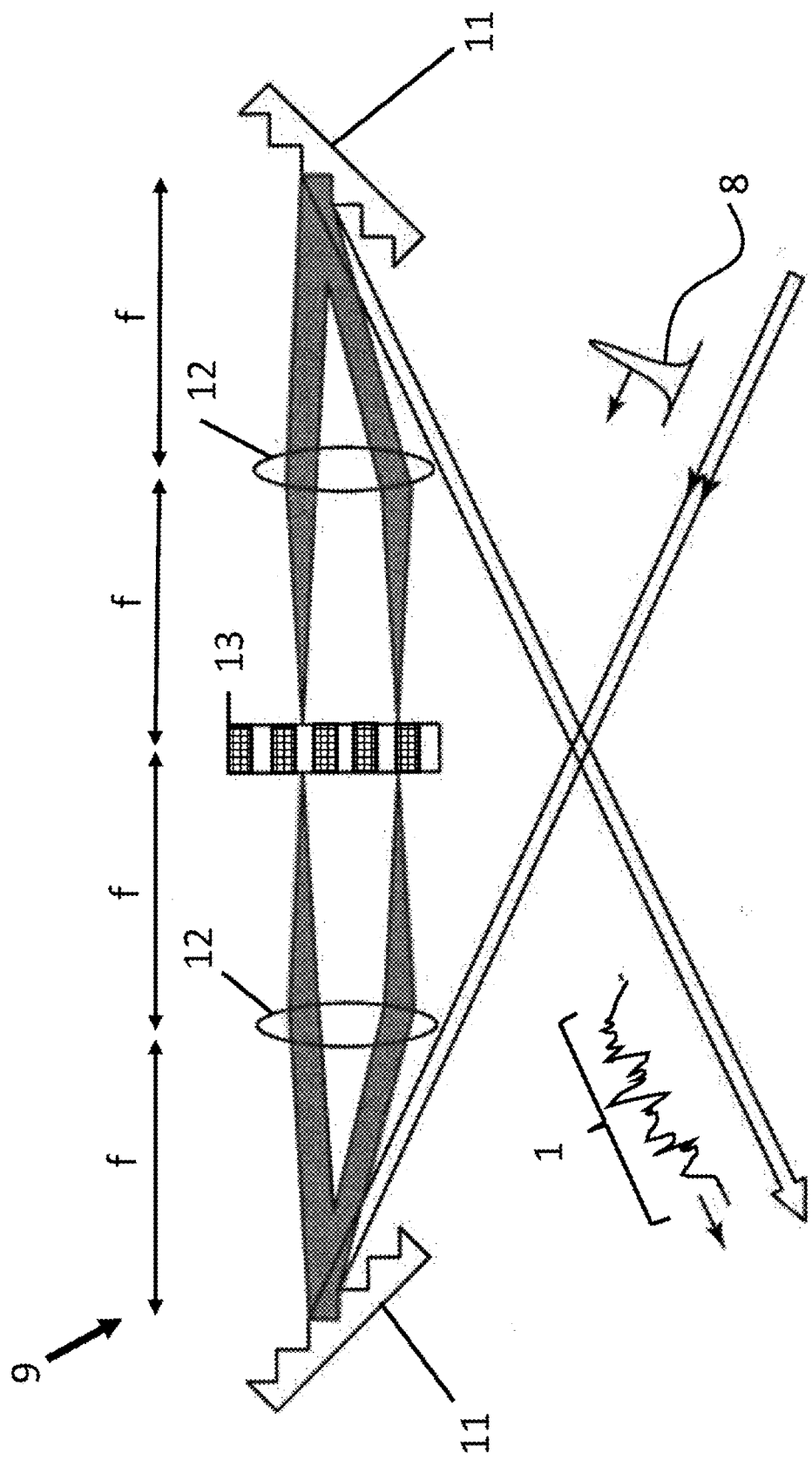
FIG. 3 schematically illustrates formation of an optical challenge in the time-frequency domain.

FIG. 3 schematically illustrates a formation of an optical challenge 1 in the time-frequency domain that can be applied within the embodiment depicted in FIG. 2. The challenge creating means 9 acts by pulse shaping of an ultrashort light pulse 8 and it can be built up as follows: the standard solution for this is the use of a pulse-shaper based on Fourier optics, relating the temporal description of an optical field to its spectral description. Exploiting this difference, and given that no electronic circuit is fast enough to electro-optically modulate an optical pulse on the sub 10 ps time scale, pulse shapers are based on a dispersive element 11 to spatially spread out an ultrashort light pulse 8 in its spectral components (typically an optical grating), a spatial light modulator 13 that changes phase or amplitude of the various spectral components, and another dispersive element 11 (for example, another grating) to recombine the spectral components to form the shaped pulse which is the optical challenge 1. The two gratings 11 in FIG. 3 can be combined when using a reflective shaper, simplifying the setup and its alignment. According to a test setup, this pulse shaper requires a setup space of ~0.5 m$^2$. Given the required resolution, the dispersive limits of diffraction gratings 11, and the size of the liquid crystal linear spatial light modulator 13, some length is required and the setup cannot easily be made much smaller.

Another design that can also be used as a challenge creating means 9 is described in "High-speed ultrawideband photonically enabled compressed sensing of sparse radio frequency signals", B. T. Bosworth and M. A. Foster, Opt. Lett. 38, 4892 (2013), "Compressive sensing based high-speed time-stretch optical microscopy for two-dimensional image acquisition", Qiang Guo, Hongwei Chen, Zhiliang Weng, Minghua Chen, Sigang Yang, and Shizhong Xie, Optics Express 23, 29639 (2015), and "High-speed flow microscopy using compressed sensing with ultrafast laser pulses", B. T. Bosworth, J. R. Stroud, D. N. Tran, T. D. Tran, S. Chin, and M. A. Foster, Opt. Express 23, 10521 (2015). It uses a dispersion compensating fiber (DCF) with a negative group velocity dispersion to spread the ultrashort pulse to several a chirped pulse of 10 ns. This is long enough to allow a fast modulator to modify up to ~200 individual time windows within the chirped pulse. The stretched pulse is subsequently compressed again to an ultrashort pulse by a normal dispersion fiber that is matched to the DCF. The advantage of this method is its robustness. A disadvantage is that it requires some kilometers of fiber, a very fast modulator, and very fast electronics. However, it can be completely integrated and fiber based and it can be boxed in a rack mount without needing regular alignment.

According to the embodiment depicted in FIG. 2, detecting in which output channel the short temporally focused pulse is created comprises using a non-linear detection technique. A non-linear detection technique is, for example, based on two-photon absorption followed by fluorescence in an organic dye, for example, a rhodamine 6G sample as used in "Focusing and compression of ultra-short pulses through scattering media", O. Katz, E. Small, Y. Bromberg, and Y. Silberberg, Nat. Photonics 5, 372 (2011), and "Spatiotemporal Coherent Control of Light through a Multiple Scattering Medium with the Multispectral Transmission Matrix", M. Mounaix et al., Phys. Rev. Lett. 116, 253901 (2016). Alternatively, non-linear mixing with a stronger reference pulse, for example, in a non-linear waveguide, can be applied, or the use of ultrafast number-resolving superconducting detectors. Streak cameras can alternatively be applied. Alternatively, detecting in which output channel the short temporally focused pulse is created, comprises an ultrafast gating technique.

Several specific examples for realizing a tPUK will be described below. The readout of tPUKs assumes the availability of suitable tPUKs. These tPUKs must have a complex challenge-response behavior in the time-frequency domain and low losses. Various aspects determine the usability of tPUKs, for example, manufacturing and characterization ease, optical losses, the complexity, collision distance, and the stability with external factors such as temperature, humidity and durability/wear. Three types of time-domain PUKs are therefore here considered.

1) Multiple-scattering media such as powders, ceramics or glass-ceramics as described in EP 3252740 B1. They have a very complex challenge-response behavior and are relatively easy to make also in bulk quantities. Their disadvantage for use as tPUKs is that they will necessarily have to be thick and therefor have relatively high loss.

2) A coiled-up section of a large-core fiber. Such fibers are also called multimode fibers and are known to have a very complex input-output behavior if they deviate enough from a straight light pipe, with much lower loss. Their spectral memory effect also quickly becomes more narrowband with length (see "All-fiber spectrometer based on speckle pattern reconstruction", B. Redding, S. M. Popoff, and H. Cao, Opt. Expr. 21, 6584 (2013)), meaning that for long fibers, a slightly different wavelength already leads to another output pattern. This is exactly what is needed for a tPUK. The potential of multimode fibers as PUKs was recently realized (see "Physical Unclonable Function based on a Multi-mode Optical Waveguide", C. Mesaritakis, M. Akriotou, A. Kapsalis, E. Grivas, C. Chaintoutis, T. Nikas, and D. Syvridis, Sci. Rep. 8, 9653 (2018)). In multimode fiber tPUKs, it is required to accurately couple the single-mode readout channel to a predetermined input mode. That this is feasible was also demonstrated for imaging purposes in "Spatiotemporal focusing through a multimode fiber via time-domain wavefront shaping", M. C. Velsink, L. V. Amitonova, and P. W. H. Pinkse, Optics Express 29, 272 (2020) (which was not published before the priority date of the present invention). At the output, it is required to sample many spatial modes. Low loss and scalable photonic lanterns (multimode to single-mode interfaces) provide a mature solution therefor. These devices can be tailored to enable low-loss readout of fiber-based PUKs. The present invention ultimately proposes the development of optical tPUKs by coiling-up a ~1 m section of multimode fiber, and immobilizing it by fixating it, for example, by casting it in a solid host.

3) Integrated photonic chips (Chip-PUKs). Chip-tPUKs can have a very complex input-output behavior in the time-frequency domain that presently cannot be predicted because of randomness in the manufacturing process. Such chips can therefore serve as very compact tPUKs and are very promising candidates for commercialization of the present invention.

Integrated photonic structures have not previously been considered as candidates for PUKs or tPUKs. The closest devices concerning functionality are linear chaotic resonators, as described in "Spatial Distribution of Phase Singularities in Optical Random Vector Waves", L. De Angelis, F. Alpeggiani, A. Di Falco, and L. Kuipers, Phys. Rev. Lett. 117, 093901 (2016), and silicon nonlinear resonators, as described in "Silicon photonic physical unclonable function", B. C. Grubel, B. T. Bosworth, M. R. Kossey, Hongcheng Sun, A. B. Cooper, M. A. Foster, and A. C. Foster, Opt. Express 25, 12710 (2017) and in WO 2017/177105 A1.

Integrated photonics is a relatively mature technology. The leading $Si_3N_4$ platform ("TripleX") developer is Lionix Int. $Si_3N_4$ is ideally suited for the present purpose because of the low losses and wide transparency window. On-chip ring resonators and even resonator networks can be built for filter applications as described in "High-Selectivity On-Chip Optical Bandpass Filter With Sub-100-MHz Flat-Top and Under-2 Shape Factor", C. Taddei, L. Zhuang, C. G. H. Roeloffzen, M. Hoekman, and K.-J. Boller, IEEE Phot. Tech. Lett. 31, 455 (2019) and in "Integrated microwave photonics", D. Marpaung, J. Yao, and J. Capmany, Nature Photonics 13, 80 (2019). There are even attempts to make a temperature-insensitive spectrum analyzer based on such a network as described in "Integrated Programmable Waveguide Circuits for Classical and Quantum Photonic Processing", C. Taballione, PhD Thesis, University of Twente, July 2019. The maturity of the technology is also demonstrated by QuiX, founded in 2019, that is developing larger and larger low-loss networks of beam splitters for applications in quantum information processing.

On-chip optical ring resonators (also called Micro Ring Resonators, MRRs) are routinely built for filter applications. Experience is that the exact optical length of a typical ring resonator cannot be controlled to better than about 0.1%. This variation is caused by uncontrollable variations in the exact width of the waveguides and intrinsic variations in the index of refraction of the amorphous $Si_3N_4$. As a consequence, although the free spectral range of a ring resonator can be designed to about 0.1%, the exact position of the resonances in the optical spectral domain is effectively random, but fixed after manufacturing. For use as Chip-tPUKs according to the present invention, the present invention seeks a design that has a single input, several outputs, low losses, and a very complex challenge-response response behavior in the time-frequency domain that cannot easily be reproduced. A network of double ring resonators fulfils these requirements and is scalable.

Figure 4:
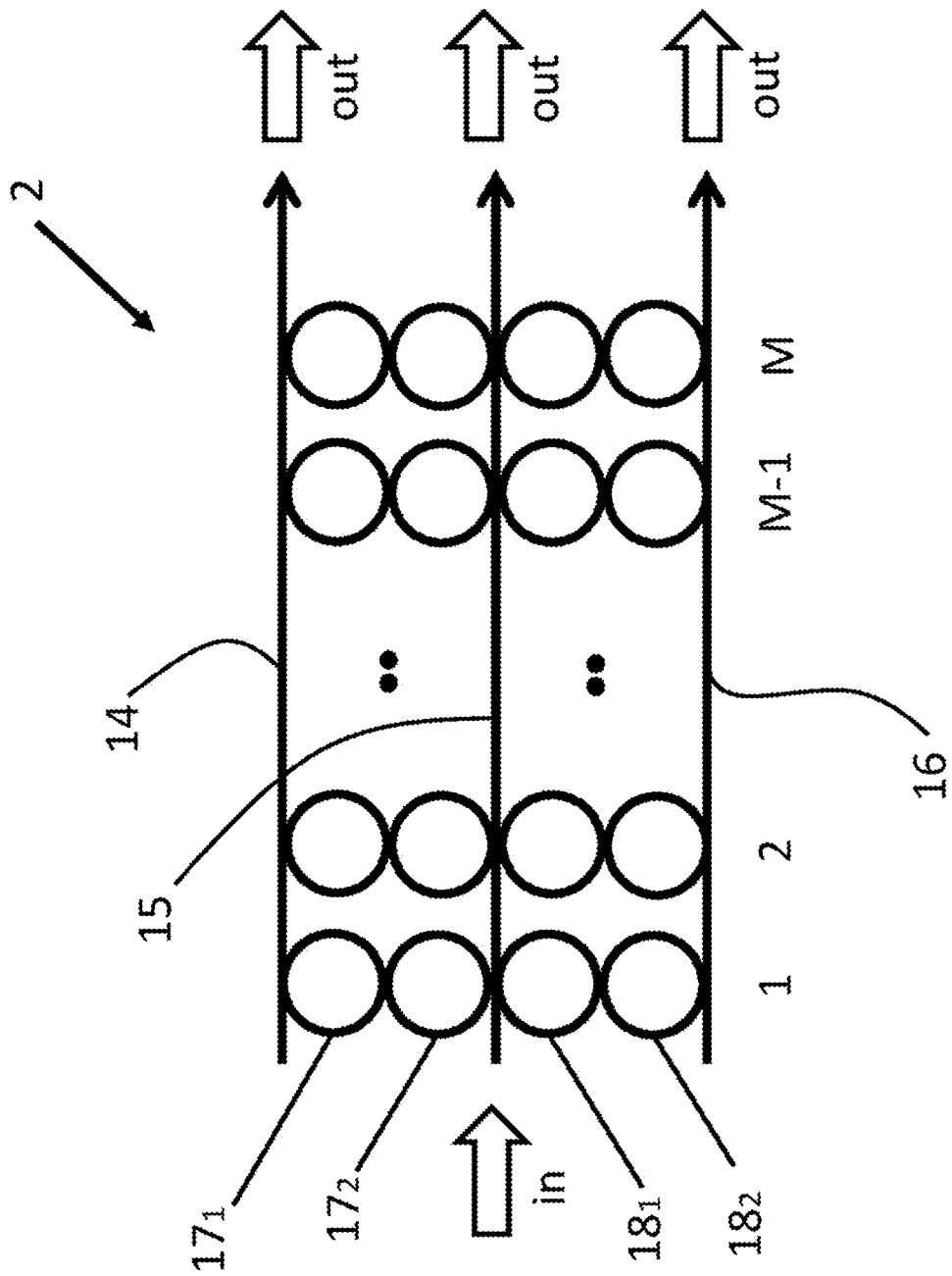
FIG. 4 schematically illustrates a tPUK design, wherein the tPUK comprises an integrated photonic structure with double ring resonators.

FIG. 4 schematically illustrates the principal idea of a Chip-tPUK design. The depicted tPUK 2 comprises a central waveguide 15 used as input, from which the light is distributed to neighboring upper and lower waveguides 14 and 16 by M sequentially arranged double ring resonators $17_1$, $17_2$, $18_1$, $18_2$. In the present example, the double ring resonators $17_1$, $17_2$, $18_1$, $18_2$ are arranged in M columns. The ring resonators $17_1$ and $17_2$ form one double ring resonator between the central waveguide 15 and the upper waveguide 14 and the ring resonators $18_1$ and $18_2$ form one double ring resonator between the central waveguide 15 and the lower waveguide 16. Because of interference between the exponentially many different pathways, the output is extremely sensitive to the exact input frequency of the light. In other words, the double ring resonators have different resonance frequencies. Apart of making the network larger and more complex by adding more columns, also the number of output channels can be straightforwardly extended from here three to any number smaller than or equal to 2 M+1.

Figure 5:
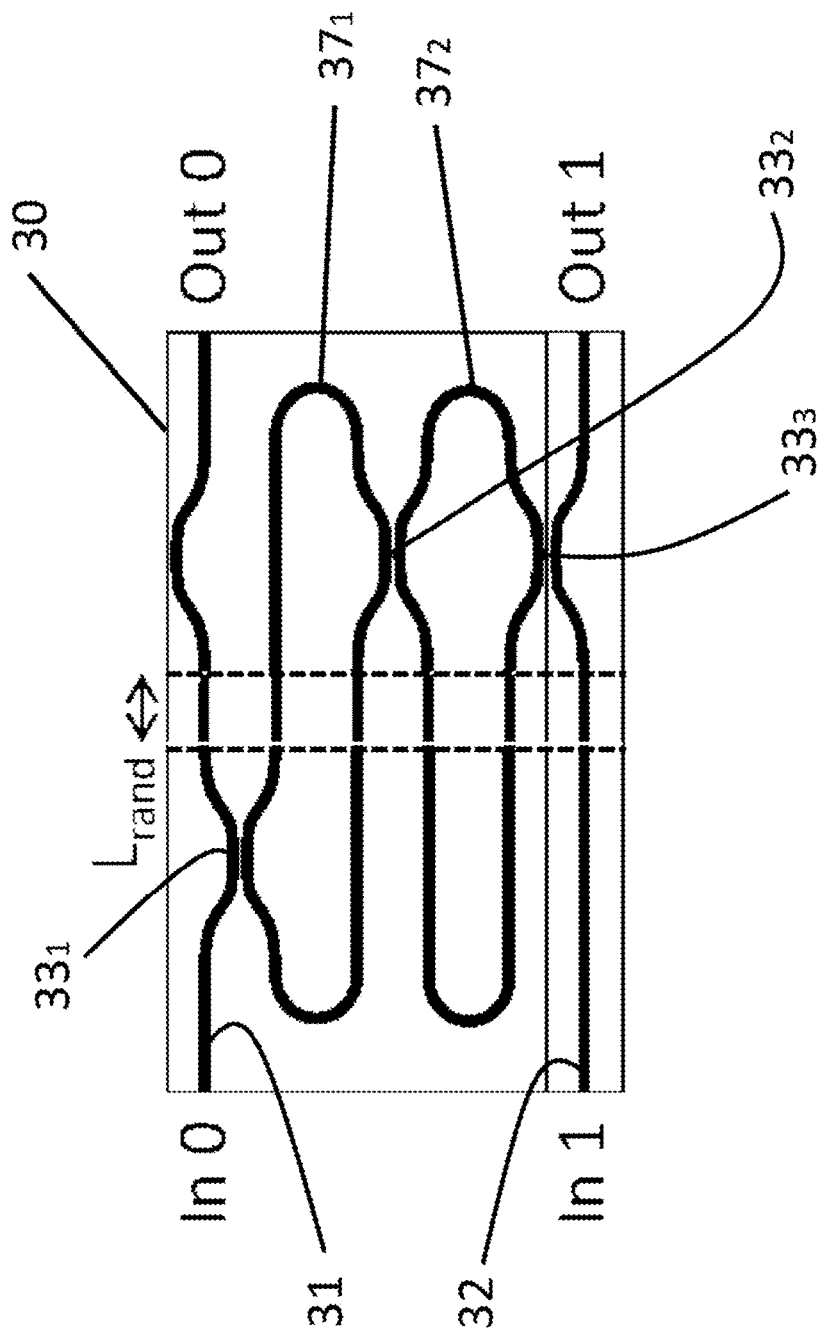
FIG. 5 schematically illustrates a unit cell of an integrated photonic structure.

According to an embodiment of the present invention, the network is substantially built-up of unit cells. An example of such a unit cell 30 is depicted in FIG. 5. The unit cell 30 comprises an input waveguide 31 and an output waveguide 32. Furthermore, between the waveguides 31 and 32, two racetrack-shaped ring resonators $37_1$ and $37_2$ forming a double ring resonator are provided. Couplers $33_1$, $33_2$, $33_3$ for coupling a ring resonator $37_1$, $37_2$ to its upper or lower neighbor or to an input or output waveguide 31, 32 are provided at straight sections of the ring resonators. The design with the racetrack-shaped ring resonators $37_1$ and $37_2$ is advantageous because it is more economic space wise; it is possible to use a smaller chip surface area for the same micro-ring resonator compared to a situation in which a circular micro-ring resonator is applied.

In the depicted example, more precisely in a network built-up of unit cells 30, the unit cells 30 comprise a designed randomly-chosen length variation $L_{rand}$. This allows for enhancing the complexity of a challenge-response behavior of the tPUK. The randomly-chosen variation in length $L_{rand}$ can, for example, be realized within a straight section of the MRR. The randomly-chosen length variation can, for example, be in the range from 0 to 10 μm. The typical outer dimensions of the unit cell 30 are 100 to 1000 μm wide or high. On top of this there are fabrication-induced random length variations (typically about 0.1%) which cannot be controlled and which therefore hinder a precise copying of the unit cell 30.

Figure 6:
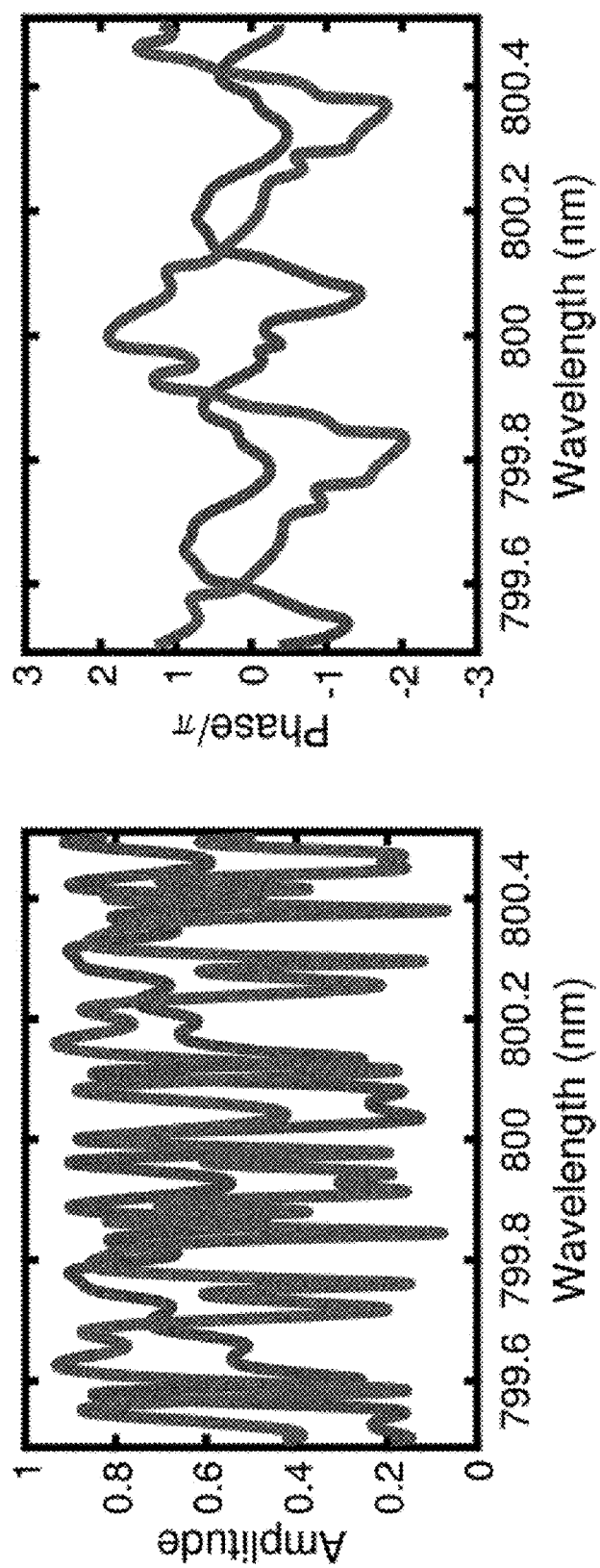
FIG. 6: exemplarily shows the output transmission (left) and phase (right) of one of the three waveguides according to FIG. 4 as a function of the input wavelength for two waveguides with realistic losses of 1.0 dB/cm.

Calculations have been performed to understand the output sensitivity of a network of 10 unit cells 30, the results of which are shown in FIG. 6. FIG. 6 exemplarily shows the output transmission (left) and phase (right) of one of the three waveguides according to FIG. 4 as a function of input wavelength for two waveguides with realistic losses of 1.0 dB/cm. Parameter scans were also performed to find an optimum size of the designed randomness for the output randomness with simulated fabrication randomness. For resonators with a length of 800 μm, (effective) length variations of only 40 nm (50 ppm) already decorrelate copies of a network. It was also found that the sensitivity to manufacturing defects grows with the number of unit cells.

Figure 7:
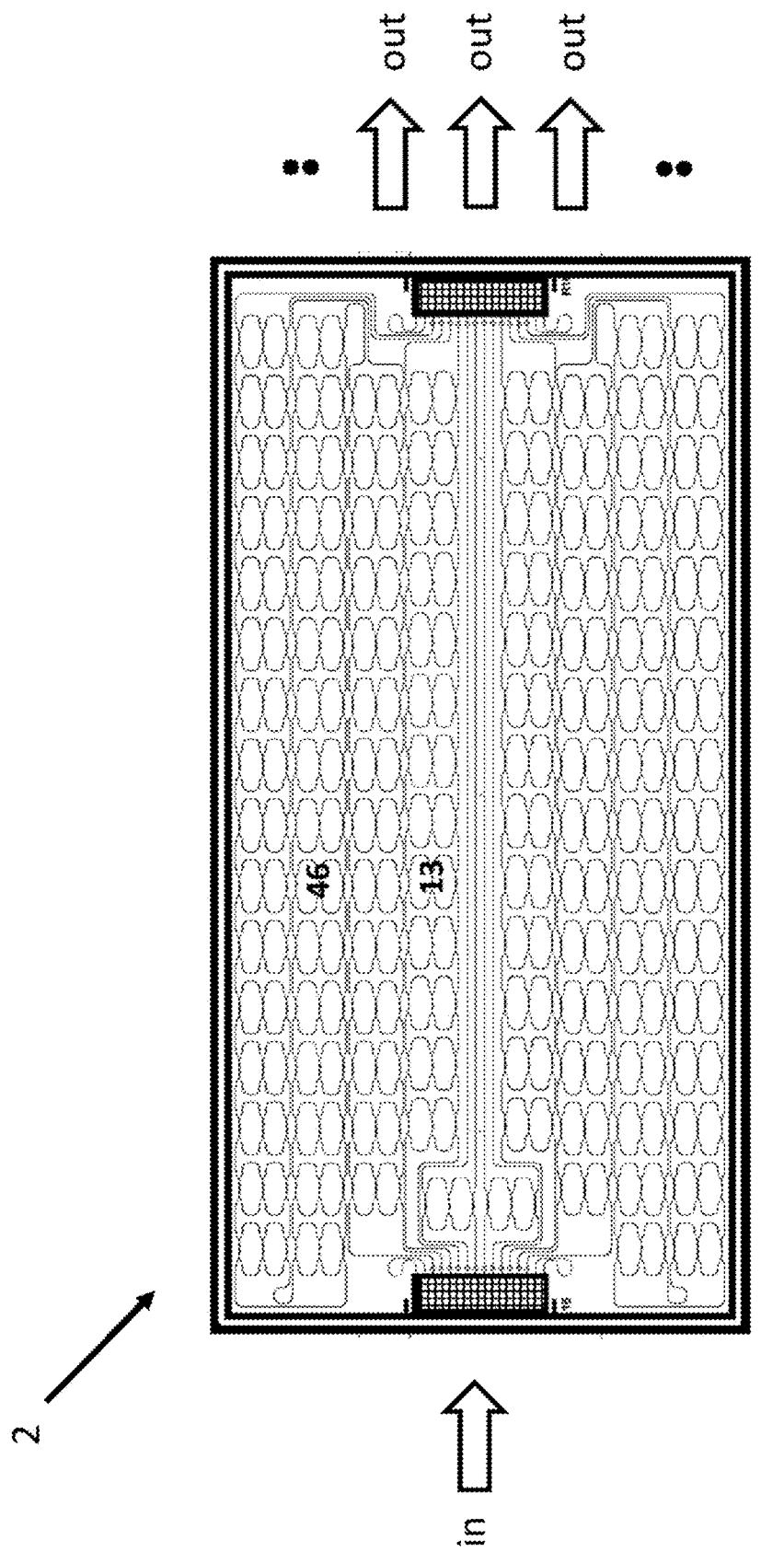
FIG. 7 schematically illustrates a tPUK comprising a network of ring resonators.
Figure 8:
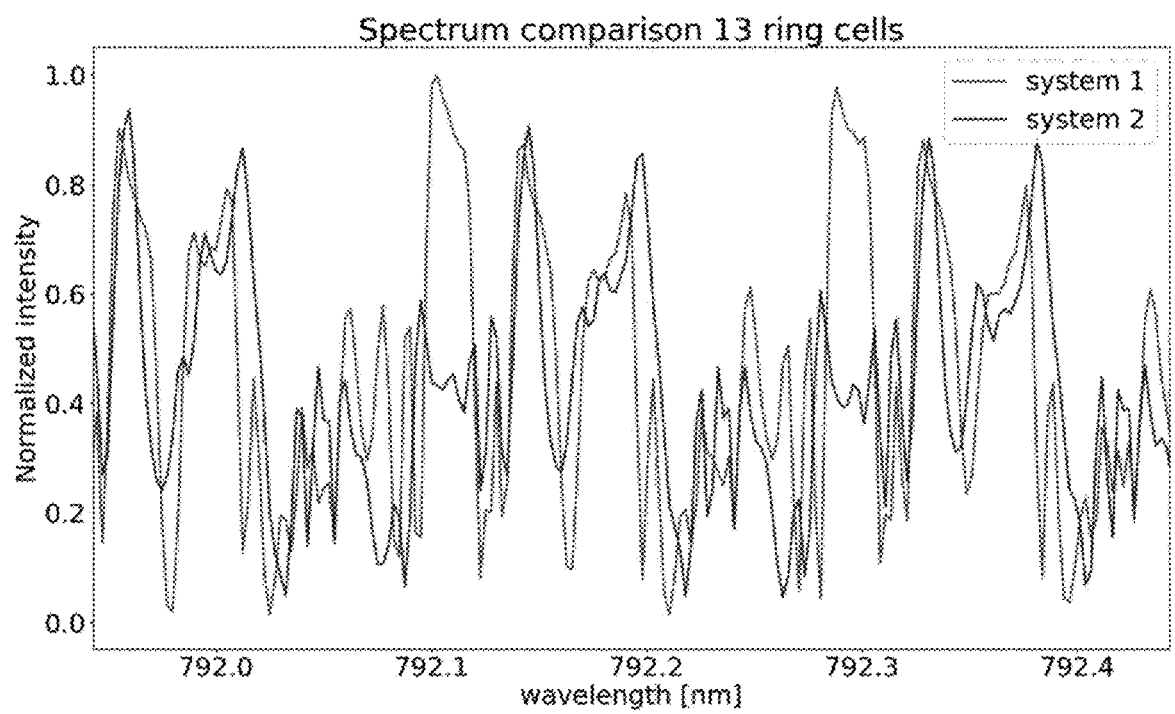
FIG. 8: exemplarily illustrates the complex challenge-response behavior of the network according to FIG. 7.
Figure 8:
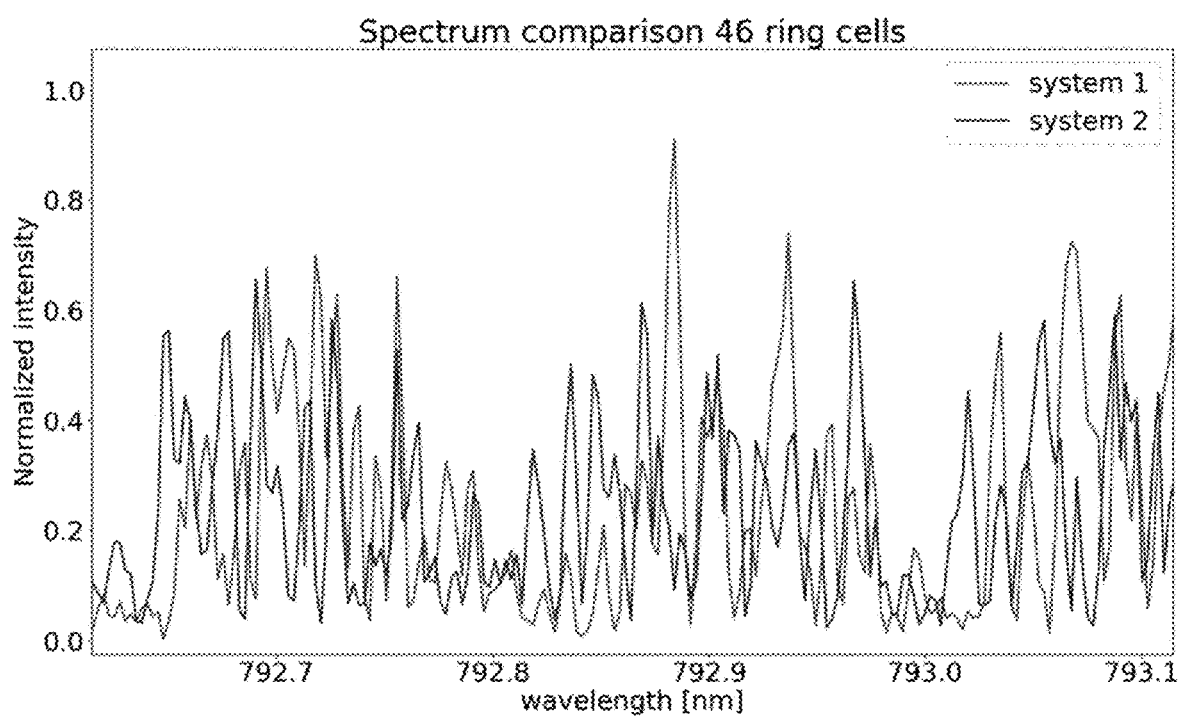

FIG. 7 schematically illustrates a tPUK 2 comprising a network of ring resonators and FIG. 8 exemplarily illustrates the complex challenge-response behavior of the network according to FIG. 7. The network of double ring resonators comprises a comparatively large number of double ring resonators, 13 double ring resonators in the more central region, close to a central input waveguide, and 46 altogether in the more distant region to the central input. A rather complex network can thereby be built-up by a plurality of double ring resonators. For analyzing the complexity of the challenge-response behavior of a thus-constructed network, two systems that have been identically manufactured (which means within the unavoidable and uncontrollable tolerances) are compared. For identical input pulses the output spectrum has been determined, respectively. If the network is built-up of 13 unit cells 30, the two spectra show a correlation of 64% which is significantly less than 100% as would be assumed for two 100% identical systems. If the network comprises 46 unit cells, the two spectra only show a correlation of 44%. This allows for a successful use of a network of ring resonators, in particular a network of double ring resonators, as a tPUK.

The present invention is not limited to embodiments described herein; reference should be had to the appended claims.

LIST OF REFERENCE SIGNS

1 Optical challenge (encoded in time-frequency domain)
2 tPUK (with challenge-response behavior in time-frequency domain)
3 Spatial input channel
4 Spatial output channel(s)
5 Detector
6 Single mode fiber
7 Temporally focused pulse (response)
8 Ultrashort light pulse
9 Challenge creating means (for creating a challenge in time-frequency domain)
10 Laser
11 Dispersive element (grating, diffraction grating)
12 Lens
13 Spatial light modulator (SLM)
14 Upper waveguide (in Chip-tPUK)
15 Central waveguide (in Chip-tPUK)
16 Lower waveguide (in Chip-tPUK)
17 Double ring resonator
18 Double ring resonator
30 Unit cell
31 Input waveguide
32 Output waveguide
37 Ring resonator
33 Coupler
80 Light pulse
81 Challenge creating means
82 Challenge encoded in spatial-frequency domain
83 PUK with challenge-response behavior in spatial-frequency domain
84 Spatially resolving detector
$84_1$ Detection area
$84_2$ Detection area
85 Physical-key Enhanced Asymmetric Communication (PEAK)
100 Alice
200 Bob
M Number of columns
$L_{rand}$ Random length variation

What is claimed is:

1. A method for an Optical Physical Unclonable Key (PUK) authenticated communication, the method comprising:
 a first party creating an optical challenge in a time-frequency domain;
 the first party providing the optical challenge to a time-frequency Optical Physical Unclonable Key (tPUK) of a second party, the tPUK comprising a spatial input channel and a plurality of spatial output channels, the tPUK being configured to provide a complex challenge-response behavior in the time-frequency domain, wherein the optical challenge is created so that the tPUK creates a response having a short temporally focused pulse in only one of the plurality of spatial output channels of the tPUK;
 the second party detecting in which of the plurality of spatial output channels the short temporally focused pulse is created; and
 the second party reporting back to the first party in which of the plurality of spatial output channels the short temporally focused pulse is created so as to authenticate the second party to the first party.

2. The method as recited in claim 1, wherein the optical challenge is provided to the spatial input channel of the tPUK through a single spatial channel.

3. The method as recited in claim 2, wherein the single spatial channel comprises a single-mode fiber.

4. The method as recited in claim 2, wherein the single spatial channel comprises a free-space link.

5. The method as recited in claim 1, further comprising:
 emitting an ultrashort laser pulse; and
 creating the optical challenge in the time-frequency domain by pulse shaping of the ultrashort laser pulse.

6. The method as recited in claim 1, wherein the detecting in which of the plurality of spatial output channels the short temporally focused pulse is created comprises discriminating a short pulse in the one of the plurality of spatial output channels from longer pulses in the other plurality of spatial output channels.

7. The method as recited in claim 1, wherein a non-linear detection technique is used to detect in which of the plurality of spatial output channels the short temporally focused pulse is created.

8. The method as recited in claim 1, wherein a gating technique is used to detect in which of the plurality of spatial output channels the short temporally focused pulse is created.

9. The method as recited in claim 1, wherein,
the optical challenge comprises a number of photons and a number of spectral components, and
the number of photons is less than the number of spectral components.

10. The method as recited in the claim 9, wherein,
the tPUK further comprises a number of separate spectral response elements, and
the number of separate spectral response elements in the tPUK is greater than the number of spectral components in the optical challenge.

11. The method as recited in claim 1, wherein the tPUK further comprises a multimode fiber.

12. The method as recited in claim 11, wherein the multimode fiber is at least partly coiled up or at least partly bent and substantially immobilized.

13. The method as recited in claim 1, wherein the tPUK further comprises an integrated photonic structure.

14. The method as recited in claim 13, wherein the integrated photonic structure comprises at least one of $Si_3N_4$ and a silicon-on-insulator (SOI).

15. The method as recited in claim 13, wherein the tPUK further comprises a network of ring resonators.

16. The method as recited in claim 13, wherein the integrated photonic structure comprises a network of double ring resonators.

17. The method as recited in claim 16, wherein,
the network of double ring resonators is provided as a plurality of M sequentially arranged double ring resonators which have different resonance frequencies,
the network of double ring resonators comprises one input waveguide and a plurality of output waveguides, and
the optical challenge is distributed from the one input waveguide to the plurality of output waveguides via the plurality of M sequentially arranged double ring resonators.

18. The method as recited in the claim 16, wherein,
the network of double ring resonators is substantially built-up of unit cells,
the unit cells each comprise racetrack-shaped ring resonators which are arranged to form a double ring resonator having an upper ring resonator and a lower ring resonator, and couplers,
one of the couplers being configured to couple the upper ring resonator to the lower ring resonator of the unit cell or to a lower ring resonator of a neighboring unit cell, to an input waveguide, or to an output waveguide, or
the coupler being configured to couple the lower ring resonator to the upper ring resonator of the unit cell or to an upper ring resonator of a neighboring unit cell, to the input waveguide, or to the output waveguide.

19. The method as recited in the claim 18, wherein the unit cells comprise a designed randomly-chosen length variation.

20. The method as recited in claim 1, wherein the second party reports directly back to the first party when reporting in which of the plurality of spatial output channels the short temporally focused pulse is created so as to authenticate the second party to the first party.

21. The method as recited in claim 1, further comprising:
using a result of the authentication as a bare authentication; and
turning the bare authentication into an authenticated communication channel for an authentication of data by using an output channel index.

22. The method as recited in claim 21, further comprising:
turning the authenticated communication channel into a confidential authenticated channel using a quantum key distribution.

23. A method for an Optical Physical Unclonable Key (PUK) authenticated communication, the method comprising:
a first party creating an optical challenge in a time-frequency domain;
the first party providing the optical challenge to a time-frequency Optical Physical Unclonable Key (tPUK) of a second party, the tPUK comprising a spatial input channel and a spatial output channel, the tPUK being configured to provide a complex challenge-response behavior in the time-frequency domain, wherein the optical challenge is created so that the tPUK creates a response having a short temporally focused pulse in the spatial output channel;
the second party detecting if the short temporally focused pulse is created in the spatial output channel; and
the second party reporting back to the first party if the short temporally focused pulse is created so as to authenticate the second party to the first party.

24. The method as recited in the claim 23, wherein, if the short temporally focused pulse is created in the spatial output channel, it is detected when the temporally short pulse occurs.

25. The method as recited in claim 23, wherein the second party reports directly back to the first party when reporting if the short temporally focused pulse is created so as to authenticate the second party to the first party.

26. The method as recited in claim 23, further comprising:
using a result of the authentication as a bare authentication; and
turning the bare authentication into an authenticated communication channel for an authentication of data by using an output channel index as a key material for a message authentication code.

27. The method as recited in claim 26, further comprising:
turning the authenticated communication channel into a confidential authenticated channel using a quantum key distribution.

28. A system for an Optical Physical Unclonable Key (PUK) authenticated communication, the system comprising:
a challenge creating means which is configured to create an optical challenge in a time-frequency domain;
a time-frequency Optical Physical Unclonable Key (tPUK) comprising,
a spatial input channel,
a plurality of spatial output channels, and
a complex challenge-response behavior in the time frequency domain, wherein the challenge creating means is configured to create the optical challenge so that a short temporally focused pulse is created in a response in only one of the plurality of spatial output channels; and a detection device which is configured to detect in which of the plurality of spatial output channels the short temporally focused pulse is created.

29. A system for an Optical Physical Unclonable Key (PUK) authenticated communication, the system comprising:

a challenge creating means which is configured to create an optical challenge in a time-frequency domain;

a time-frequency Optical Physical Unclonable Key (tPUK) comprising,
 a spatial input channel,
 a spatial output channel, and
 a complex challenge-response behavior in the time-frequency domain, wherein the challenge creating means is configured to create the optical challenge so that a short temporally focused pulse is created in the response in the spatial output channel; and a detection device which is configured to detect if the short temporally focused pulse is created in the output channel.

* * * * *